No. 616,709. Patented Dec. 27, 1898.
J. R. HOPE.
MACHINE FOR MERCERIZING.
(Application filed Apr. 5, 1898.)
(No Model.)
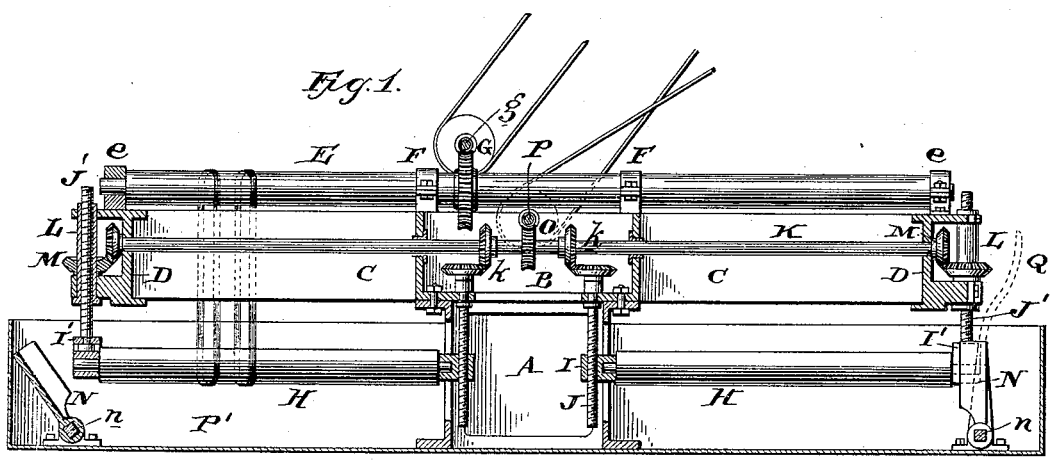
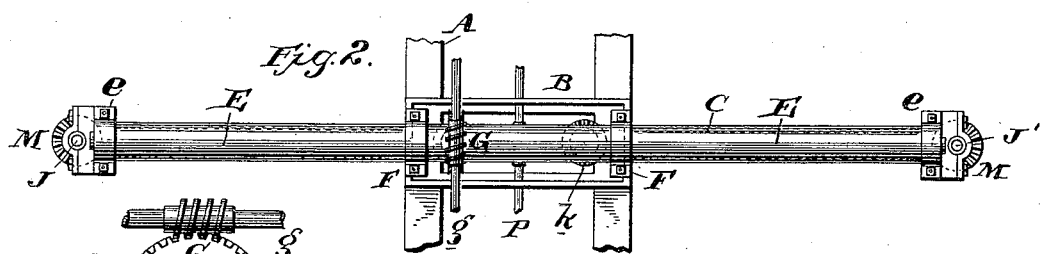
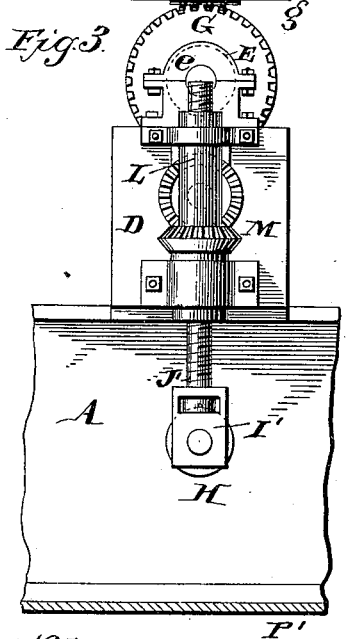
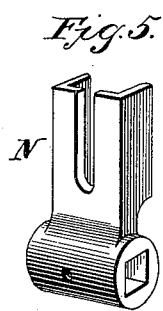
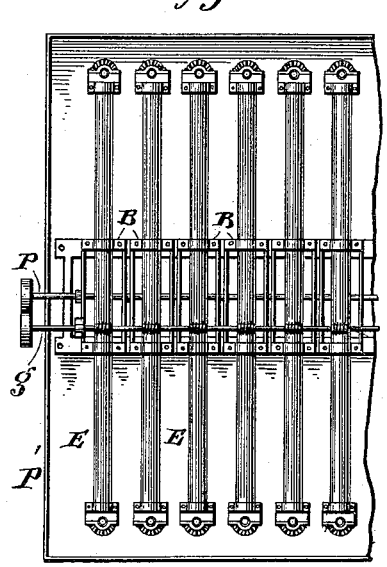
Witnesses
E. C. Wurdeman
R. M. Kelly
Inventor
James R. Hope
By [signature]
Attorney

UNITED STATES PATENT OFFICE.

JAMES ROLAND HOPE, OF PHILADELPHIA, PENNSYLVANIA, ASSIGNOR OF TWO-THIRDS TO THOMAS McCONNELL, OF CHESTER, AND WILLIAM GALEY, OF OVERBROOK, PENNSYLVANIA.

MACHINE FOR MERCERIZING.

SPECIFICATION forming part of Letters Patent No. 616,709, dated December 27, 1898.

Application filed April 5, 1898. Serial No. 676,596. (No model.)

*To all whom it may concern:*

Be it known that I, JAMES ROLAND HOPE, of the city and county of Philadelphia, State of Pennsylvania, have invented an Improvement in Mercerizing-Machines, of which the following is a specification.

My invention has reference to machines for treating yarns for mercerizing, dyeing, &c.; and it consists of certain improvements which are fully set forth in the following specification and shown in the accompanying drawings, which form a part thereof.

In carrying out my invention I provide a main frame with one or more overhanging supports extending from one or both sides and combine therewith a power-driven roller and one or more loose rollers arranged in connection with each of the overhanging supports. These pairs of rollers are relatively adjustable to or from each other and so sustained that they permit the yarn to be easily placed upon them or taken off. The frame is preferably removable from a vat or tank in which it sets and is so proportioned that the lower roller alone may rotate in the liquid contained therein. In the case of mercerizing, the caustic soda or other alkaline solutions is preferably only sufficient to submerge the lower rollers.

In my preferred form of apparatus the upper roller of a set is continuous, so as to overhang each side of the central frame and arranged to work in conjunction with two loose shorter independent rollers at a lower level and respectively located one on each side of the central frame, so as to balance the weight of the rollers and yarn upon the main frame to facilitate the handling thereof with its load when removed from the vat. I also prefer that there shall be a series of sets of these rollers arranged parallel to each other, carried by the same main frame and adapted to the same vat. I also prefer to drive all of the upper rollers by the same power devices and to adjust the lower rollers simultaneously. It is, of course, evident that the relation of the rollers may be inverted; but I prefer the arrangement specifically shown as being best suited to the purpose.

My invention will be better understood by reference to the accompanying drawings, in which—

Figure 1 is a transverse sectional elevation through my improved machine. Fig. 2 is a plan view of one of the sections of yarn-holding devices removed. Fig. 3 is an end elevation of same. Fig. 4 is a plan view of one end of the machine, showing the relation of a series of the sections shown in Fig. 2; and Fig. 5 is a perspective view of one of the guides for the lower rollers.

A is a longitudinal main frame normally adapted to rest in the vat P' in a central position, as shown. Secured upon this frame are a series of sets of yarn-carrying rollers arranged parallel, as shown. I will now describe one of these sets of rollers and their connections, and this may be taken as a description of them all.

B is a box-frame and has extending laterally from it on opposite sides the arms C, terminating in heads D.

E is a long roller, approximately about ten feet in length, and is carried in journal-bearings $e$ F upon the frame B C D. This roller, intermediate of the bearings F, has a worm-wheel which is driven by a worm G on a shaft $g$. The arms C C are preferably formed of two parallel plates and of a total width less than the diameter of the roller E, as indicated by the dotted lines in Fig. 2.

H H are two short rollers or guides of about four feet long each and hung below the arms C and the outer portions of the rollers E. These rollers H are journaled in bearings I I', vertically adjustable in any suitable manner. As shown, the bearing I' is carried upon the bottom of a screw-threaded shaft J', screwed into a nut L, arranged in the head D and provided with one of a pair of bevel-gears M. The other of the gears is upon the end of the shaft K, extending through the center of the frame B C D to the extreme opposite side. The other bearing I is screwed upon a depending screw J, journaled in the frame B and geared to the shaft K by bevel-gears $k$. When the shaft K rotates, the bearings I I' and their roller H are elevated or depressed, and thus moved to or from the roller E. The shaft K is rotated by worm and worm-wheel gearing O and driven by a transverse shaft P, which may be turned by power or hand. When the machine is operating for treating the yarn to the action of the liquor in the vat P', the shaft P is stationary and the shaft $g$ continuously rotating. This rotation may be always in the same direction or may be alternated in direction at intervals, as is well known in this class of machinery.

The bearing I is guided in the main frame A; but as I prefer to have no fixed guides for the outer bearing I', on account of the inconvenience therefrom of handling the yarn, I may arrange a guide N upon a rock-shaft $n$ in the lower part of the vat or otherwise. This guide N may be temporarily made to steady the outer bearing I laterally when in use. The shaft $n$, carrying the guides N, may be rocked by a suitable hand-lever Q or the guides N be fixed in position in the vat.

The rollers H on both sides of the central frame A and their connections are identical. Hence the above description applies to all of said rollers.

The vat P' may be of any desired length and as many sets of rollers as preferred may be arranged side by side and carried by the same main frame A, as is indicated in Fig. 4. The shaft P operates all of the several shafts K simultaneously, and likewise the shaft $g$ operates all of the upper rollers E simultaneously and at the same speeds.

By the adjustment of the rollers E H relatively to or from each other any desired degree of tension may be put upon the yarn being treated.

When this machine is used for mercerizing, the frame A, with its rollers, is preferably lifted by a suitable crane or hoist (not shown) from or above the vat, and the yarn may be placed over the ends of the rollers. The lower rollers are then adjusted to secure the proper tension and the apparatus lowered into the vat, or the tension may be adjusted after the apparatus is lowered into the vat, as desired.

It is evident that, if desired, the roller apparatus may be turned upside down and used with the vat, or the adjustment may be applied to the upper rollers E in place of to the lower rollers H, as will be self-evident to one skilled in the art. It is also to be understood that rollers or portions thereof to one side of the frame A may be omitted, if desired. Therefore while I prefer the construction as shown the minor details may be modified without departing from the spirit of my invention.

What I claim as new, and desire to secure by Letters Patent, is—

1. In a machine for treating yarns, the combination of a vat, a main frame adapted to said vat and of greatly less width, a long transversely-arranged roller overhanging the main frame at each side whereby the overhanging portions are above the interior of the vat, power devices for rotating the said roller, two short rollers arranged respectively upon opposite sides of the main frame within the vat and at a lower level than the long roller, and connecting means between the outer ends of the lower rollers and the corresponding ends of the upper roller adapted to hold the upper rollers separated from the lower rollers.

2. In a machine for treating yarns the combination of a vat, a main frame adapted to said vat and of greatly less width, a long transversely-arranged roller overhanging the main frame at each side whereby the overhanging portions are above the interior of the vat, power devices for rotating the said roller, two short rollers arranged respectively upon opposite sides of the main frame within the vat and at a lower level than the long roller, independent supporting means carried by the main frame for adjusting the short rollers to or from the long roller, and adjusting devices for simultaneously adjusting all of said supporting means for the short rollers.

3. In a machine for treating yarns, the combination of a vat, a series of narrow parallel transverse frames connected together by a longitudinal frame adapted to said vat, long transversely-arranged rollers journaled upon the upper side of the transverse frame, power devices for rotating the said rollers, short rollers arranged respectively upon opposite sides of the longitudinal frame and below the transverse frames within the vat and at a lower level than the long rollers, and means for simultaneously adjusting the short rollers to or from the long rollers.

4. In a machine for treating yarns, the combination of a vat, a main frame adapted to be inserted or removed from said vat, a long transversely-arranged roller overhanging the main frame at each side, power devices for rotating the said roller, two short rollers arranged respectively upon opposite sides of the main frame within the vat and at a lower level than the long roller, and means for adjusting the short rollers to or from the long roller, and guides for the short rollers arranged in said vat and independent of the main frame.

5. In a machine for treating yarns, the combination of a vat, a long main frame normally resting upon the bottom of the vat and of greatly less width than the vat, a series of parallel laterally projecting or overhanging frames carried by the main frame and extending beyond each side thereof, a series of parallel sets of yarn-carrying rollers projecting over the vat upon each side of the main frame of less diameter than the width of and supported at their outer ends by the parallel laterally-projecting arms, and means for continuously rotating one or more of the rollers of each set.

6. In a machine for treating yarns, the combination of a vat, a long main frame normally resting upon the bottom of the vat, and a series of parallel sets of yarn-carrying rollers projecting over the vat upon each side of and supported by the main frame, means for continuously rotating one or more of the rollers of each set, and means for adjusting the rollers of each set to or from each other and mechanically connecting their outer ends in pairs to prevent them being drawn together under the shrinking action of the yarn.

7. In a machine for treating yarns, the combination of a vat, a main frame, a transverse frame carried by the main frame and greatly overhanging each side thereof, a long roller journaled in bearings upon said transverse frame, lower rollers arranged below the overhanging parts of said transverse frame upon each side of the main frame, sustained from said overhanging frame, adjusting devices for said lower rollers to adjust them vertically and sustain them in position, and means for rotating the upper roller.

8. In a machine for treating yarns, the combination of a vat, a main frame, a transverse frame carried by the main frame and overhanging each side thereof, a long roller journaled in bearings upon said transverse frame, lower rollers arranged below the overhanging parts of said transverse frame upon each side of the main frame, adjusting devices for said lower rollers to adjust them vertically and sustain them in position, guides for the inner ends of the lower rollers secured to the main frame, guides for the outer ends of the lower rollers carried by the vat, and means for rotating the upper roller.

9. In a machine for treating yarns, the combination of a vat, a main frame, a transverse frame carried by the main frame and overhanging each side thereof, a long roller journaled in bearings upon said transverse frame, lower rollers arranged below the overhanging parts of said transverse frame upon each side of the main frame, adjusting devices consisting of vertical screws a transverse shaft, and gearing between the shaft and screws for said lower rollers to simultaneously adjust them vertically and sustain them in position, and means for rotating the upper roller.

10. In a machine for treating yarn a vat, in combination with a long main frame provided with a series of parallel lateral overhanging arms, rollers supported in bearings on said overhanging arms so as to be sustained above them, rollers arranged below said overhanging arms, and means for sustaining said lower rollers from said arms whereby they are suspended in the vat to one side of the main frame.

11. In a machine for treating yarn a vat, in combination with a main frame provided with a series of parallel lateral overhanging arms, rollers supported in bearings on said overhanging arms so as to be sustained above them, rollers arranged below said overhanging arms, means for sustaining said lower rollers from said arms whereby they are suspended in the vat immediately to one side of the main frame, and means depending from the outer end of said arms for vertically adjusting the outer ends of the lower rollers to or from the upper rollers.

12. In a machine for treating yarn a vat, in combination with a main frame provided with a series of parallel overhanging arms, rollers supported in bearings on said overhanging arms so as to be sustained above them, rollers arranged below said overhanging arms, and means for sustaining said lower rollers from said arms whereby they are suspended in the vat to one side of the main frame, and guides for the outer ends of the lower rollers arranged in the vat and independent of the main frame.

13. In a machine for treating yarn, a vat, in combination with a main frame provided with a series of parallel overhanging arms, rollers supported in bearings on said overhanging arms so as to be sustained above them, rollers arranged below said overhanging arms, and means for sustaining said lower rollers from said arms whereby they are suspended in the vat to one side of the main frame, and common power devices to simultaneously rotate all of the upper rollers.

14. In a machine for treating yarn, a vat, in combination with a main frame provided with a series of parallel overhanging arms, rollers supported in bearings on said overhanging arms so as to be sustained above them, rollers arranged below said overhanging arms, means for sustaining said lower rollers from said arms whereby they are suspended in the vat to one side of the main frame, common power devices to simultaneously rotate all of the upper rollers, and means for simultaneously adjusting all of the lower rollers vertically.

15. In a machine for treating yarns, a vat in combination with main frame A, the frame B having overhanging arm C, secured to the top of the main frame, the upper roller E journaled above the arm C, a lower roller H, vertical screws J J' for adjusting the roller H vertically, a transverse shaft K, gearing M $k$ for operating the screws from the transverse shaft, and power devices to rotate the roller E.

16. The combination of a series of laterally-extending overhanging frames C arranged parallel to each other and connected at the middle portions to form an integral structure, a series of long upper rollers extending over the lateral frame on each side of the center and journaled thereto, worm and worm-wheel gears for driving the said series of rollers, a longitudinal power-shaft operating all of the worms of said gears, a double series of short rollers arranged so that one of said rollers is below each of the overhanging frames, adjusting-screws for adjusting said short rollers to and from the arms and relatively to and from the upper rollers, power devices for simultaneously operating all of the adjusting-screws, and a vat adapted to receive all of the lower rollers.

In testimony of which invention I hereunto set my hand.

JAMES ROLAND HOPE.

Witnesses:
J. W. KENWORTHY,
ERNEST HOWARD HUNTER.